United States Patent
Cho et al.

(10) Patent No.: US 9,628,841 B2
(45) Date of Patent: Apr. 18, 2017

(54) METHOD AND DEVICE FOR CONTROLLING DOWNLOADING OF SECURITY MODULE FOR BROADCAST SERVICE

(71) Applicant: Alticast Corporation, Seoul (KR)

(72) Inventors: Mi-Sung Cho, Seoul (KR); YoungMi Shin, Suwon-si (KR); Taeln Eom, Gwangmyeong-si (KR); Su Yong Lee, Seoul (KR); EunJung Seo, Yongin-si (KR); Eunwoo Kim, Seoul (KR)

(73) Assignee: Alticast Corporation, Seoul (KR)

( * ) Notice: Subject to any disclaimer, the term of this patent is extended or adjusted under 35 U.S.C. 154(b) by 0 days.

(21) Appl. No.: 14/764,477

(22) PCT Filed: Jun. 25, 2013

(86) PCT No.: PCT/KR2013/005614
§ 371 (c)(1),
(2) Date: Jul. 29, 2015

(87) PCT Pub. No.: WO2014/123283
PCT Pub. Date: Aug. 14, 2014

(65) Prior Publication Data
US 2015/0382044 A1 Dec. 31, 2015

(30) Foreign Application Priority Data

Feb. 5, 2013 (KR) .................. 10-2013-0012900

(51) Int. Cl.
*H04N 7/16* (2011.01)
*H04N 7/167* (2011.01)
(Continued)

(52) U.S. Cl.
CPC ....... *H04N 21/4181* (2013.01); *H04N 21/231* (2013.01); *H04N 21/2347* (2013.01);
(Continued)

(58) Field of Classification Search
CPC .................................. H04N 21/4432
See application file for complete search history.

(56) References Cited

U.S. PATENT DOCUMENTS 8,892,876 B1 * 11/2014 Huang ............... G06F 21/6209
713/165
2006/0137015 A1 * 6/2006 Fahrny ............... H04N 7/17318
726/26
(Continued)

FOREIGN PATENT DOCUMENTS

KR    20060113091 A    11/2006
KR    100926910 B1    11/2009
(Continued)

OTHER PUBLICATIONS

International Search Report PCT/ISA/210 for International Application No. PCT/KR2013/005614 Dated Nov. 18, 2013.

*Primary Examiner* — Justin Shepard
(74) *Attorney, Agent, or Firm* — Harness, Dickey & Pierce, P.L.C.

(57) ABSTRACT

A method and device for controlling a download of a broadcast service security module are disclosed. In a method for controlling a download of a security module for a broadcast service in a user terminal connected to a service server and a security server through a network, a loader is downloaded by allowing the user terminal to be connected to the service server. The user terminal is connected to the security server through the loader. A bootloader is downloaded from the security server. A security module is downloaded from the security server by executing the bootloader.

10 Claims, 3 Drawing Sheets

(51) Int. Cl.

| | | |
|---|---|---|
| *H04N 5/445* | (2011.01) | |
| *G06F 3/00* | (2006.01) | |
| *G06F 13/00* | (2006.01) | |
| *H04N 21/418* | (2011.01) | |
| *H04N 21/443* | (2011.01) | |
| *H04N 21/25* | (2011.01) | |
| *H04N 21/258* | (2011.01) | |
| *H04N 21/433* | (2011.01) | |
| *H04N 21/2347* | (2011.01) | |
| *H04N 21/81* | (2011.01) | |
| *H04N 21/231* | (2011.01) | |
| *H04N 21/254* | (2011.01) | |
| *H04N 21/6334* | (2011.01) | |
| *H04N 21/458* | (2011.01) | |

(52) U.S. Cl.
CPC ......... *H04N 21/25* (2013.01); *H04N 21/2541* (2013.01); *H04N 21/25816* (2013.01); *H04N 21/25875* (2013.01); *H04N 21/433* (2013.01); *H04N 21/443* (2013.01); *H04N 21/4432* (2013.01); *H04N 21/4586* (2013.01); *H04N 21/6334* (2013.01); *H04N 21/8193* (2013.01)

(56) References Cited

U.S. PATENT DOCUMENTS

| | | | |
|---|---|---|---|
| 2007/0083744 A1* | 4/2007 | Seok | G06F 9/4401 713/1 |
| 2007/0214348 A1* | 9/2007 | Danielsen | G06F 9/4416 713/2 |
| 2009/0150974 A1* | 6/2009 | Cho | H04N 7/163 726/2 |
| 2010/0161966 A1 | 6/2010 | Kwon et al. | |
| 2011/0125995 A1* | 5/2011 | Choi | G06F 21/575 713/2 |
| 2012/0117561 A1 | 5/2012 | Lee et al. | |
| 2013/0080483 A1* | 3/2013 | Richards | G06F 17/3087 707/803 |
| 2013/0290694 A1* | 10/2013 | Civilini | H04L 41/28 713/2 |

FOREIGN PATENT DOCUMENTS

| | | |
|---|---|---|
| KR | 100950597 B1 | 4/2010 |
| KR | 20100072909 A | 7/2010 |
| KR | 101097372 B1 | 12/2011 |

\* cited by examiner

METHOD AND DEVICE FOR CONTROLLING DOWNLOADING OF SECURITY MODULE FOR BROADCAST SERVICE

CROSS-REFERENCE TO RELATED APPLICATIONS

This is a National Phase Application of PCT/KR2013/005614, filed Jun. 25, 2013, which is an International Application claiming priority to Korean Application No. 10-2013-0012900, filed Feb. 5, 2013, the entire contents of each of which are hereby incorporated by reference.

TECHNICAL FIELD

The present invention relates to a method and a device for controlling a download of a broadcast service security module, and more particularly, to a method and a device capable of safely downloading a security module for broadcast services.

BACKGROUND ART

Digital conversion of broadcasting is made all over the world, and digital conversion of technology and systems related to broadcast production has already been completed.

Unlike analog contents, digital contents can be perfectly copied and easily edited and distributed in terms of characteristics of media. Hence, it is essential to limit access to contents and protect the contents.

For this reason, there are proposed a conditional access system (hereinafter, referred to as a 'CAS') and a digital rights management (DRM), which enable only legal subscribers to access a corresponding content.

The CAS enables, together with a subscriber management system (SMS), only permitted subscribers to receive and reproduce a specific program.

In a general CAS, a head-end of a broadcast provider scrambles a content by using a control word (CW). In this case, the CW is encrypted as an authentication key, and the authentication key is encrypted as a distribution key.

Subsequently, the CW, the authentication key, and the like are included in a predetermined message (e.g., a qualification control message or a qualification management message) to be transmitted to a broadcast receiver.

Here, the broadcast receiver may be an ordinary set-top box.

When a scrambled transmission stream (scrambled content) is received, the set-top box decrypts an authentication key as a distribution key, and acquires a CW with the decrypted authentication key. The set-top box descrambles the scrambled transmission stream through the acquired CW and outputs the descrambled transmission stream as a signal in a visible and audible form.

Conventionally, a module for supporting CAS functions was built in the set-top box in an embedded manner. However, a downloadable conditional access system (DCAS) for providing a CAS client from a sever in a download manner has recently been proposed.

Although the DCAS is applied, a module related to a certificate, etc. for a security framework should be built in the DCAS in a process of manufacturing the set-top box.

Broadcast services have recently been used through not only set-top boxes installed in homes but also mobile devices such as mobile communication terminals (smart phones) and tablet PCs.

In an N-screen environment, it is difficult to provide a security module in advance. Hence, it is required to provide the security module in the download manner.

However, when a security module for broadcast services, particularly paid broadcast services is provided in the download manner without any limitation, the security module may be illegally copied.

Particularly, open source based terminals have been generally provided in recent years. In this case, various licenses exist for an open source, but the basic concept of the open source is to freely publish and distribute a kind of design map referred when software is made.

However, when a security module for broadcast services is provided based on an open source, the security module may be illegally made and distributed with reference to its design map. Hence, it is required to prevent the security module and software for supporting thereto from being open.

DISCLOSURE

Technical Problem

An embodiment of the present invention is directed to a method and a device for controlling a download of a broadcast service security module, which enable a security module to be safely downloaded in a terminal in which the security module is not built in an embedded manner.

Technical Solution

According to an aspect of the present invention, there is provided a method for controlling a download of a security module for a broadcast service in a user terminal connected to a service server and a security server through a network, the method including: downloading a loader by allowing the user terminal to be connected to the service server; connecting the user terminal to the security server through the loader; downloading a bootloader from the security server; and downloading a security module from the security server by executing the bootloader.

The security module may include at least one of a CAS client, a DRM client, a security policy, and a certificate.

The service server may include at least one of a web server and a mobile app store server.

The loader may include address information of the security server, and communicate with the security server by using the address information.

The bootloader may determine whether each of the CAS client, the DRM client, the security policy, and the certificate exists and whether each of the CAS client, the DRM client, the security policy, and the certificate is updated.

The bootloader may determine whether a new bootloader is downloaded with reference to the security policy.

The bootloader and the security module may perform decryption of an encrypted content.

According to another aspect of the present invention, there is provided a computer-readable recording medium recording a program for performing the method.

According to still another aspect of the present invention, there is provided a security server device connected to a user terminal through a network, the security server device including: a communication unit configured to receive a request of a bootloader from the user terminal connected to a service server to drive a loader; a storage unit configured to store the bootloader and a security module requested by the user terminal to which the bootloader is downloaded;

and a controller configured to control the bootloader and the security module to be transmitted through the communication unit.

It should be understood that different embodiments of the invention, including those described under different aspects of the invention, are meant to be generally applicable to all aspects of the invention. Any embodiment may be combined with any other embodiment unless inappropriate. All examples are illustrative and non-limiting.

Advantageous Effects

According to the present invention, a bootloader can be downloaded through a loader provided from the service server, so that it is possible to prevent the bootloader including a security module from being opened.

MODE FOR THE INVENTION

Figure 1:
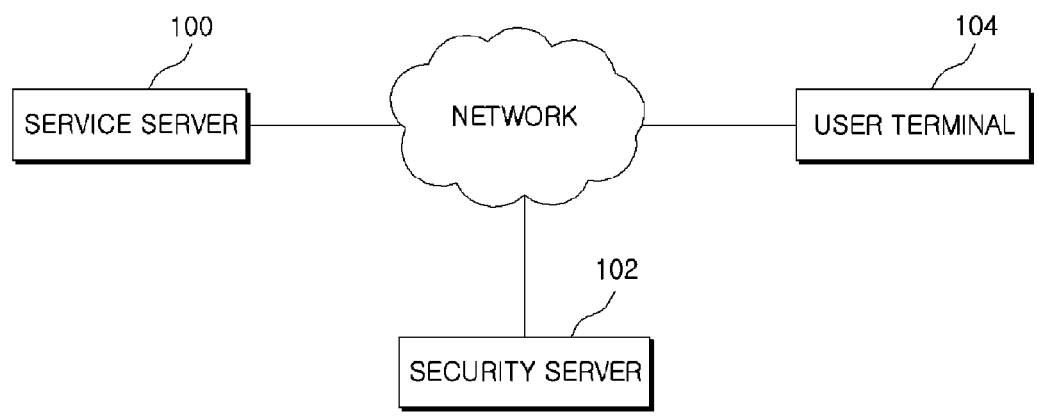
FIG. 1 is a diagram illustrating a system for providing a broadcast service security module according to an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a diagram illustrating a system for providing a broadcast service security module according to an embodiment of the present invention.

As shown in FIG. 1, the system according to the embodiment of the present invention may include a service server 100 for providing a security module for broadcast services, a security server 102, and a user terminal 104 connected to the servers 100 and 102 through a network.

Here, the network may include wire/wireless Internet, broadcast networks, satellite networks, and the like.

The user terminal 104 according to the embodiment of the present invention may include a set-top box in which a security module for broadcast services is not built in an embedded manner, or a mobile terminal such as a mobile communication terminal and a tablet PC.

In addition, the user terminal 104 may include all terminals which can be connected through a network, and download and execute a security module.

The security module according to the embodiment of the present invention is an application and configuration file which enables only legal users to use an encrypted content such as a paid live program or a program on demand. The security module may include a certificate, a security policy, a CAS client, DRM client, a security client, and the like. Download and management of the security module are performed by a bootloader.

According to the embodiment of the present invention, the bootloader and the security module can be provided to the user terminal 104 in a state in which they are not open.

When a connection of the user terminal 104 exists, the service server 100 according to the embodiment of the present invention provides a loader to the user terminal 104.

Here, the service server 100 may be an ordinary web server or a mobile app store.

The user terminal 104 according to the embodiment of the present invention may be a browser based terminal. In such a browser environment, the user terminal 104 may be connected to a web server through a browser, and the web server transmits a loader to the user terminal 104.

The loader may be an application executed in a plug-in manner. The web server may allow the loader to be included in a web page and transmit the web page to the user terminal 104.

When any loader is not installed in the user terminal 104, the user terminal 104 allows a loader provided from the web server to be installed therein and executes the loader.

The loader according to the embodiment of the present invention may be provided even in a mobile app environment. The user terminal 104 may be connected to a mobile app store server and may download the loader.

Preferably, when a user downloads a mobile app for using broadcast services in the mobile app environment, the loader may be included in the corresponding mobile app to be downloaded.

The loader according to the embodiment of the present invention includes address information of the security server 102, and communicates with the security server 102 by using the address information.

When the user terminal 104 is connected to the security server 102 through the loader, the security server 102 transmits a bootloader to the user terminal 104.

The bootloader according to the embodiment of the present invention controls downloads of a certificate, a security client, and a security policy, and determines whether a security module exists and whether the security module is updated in connection with the security server 102.

Accordingly, in the embodiment of the present invention, the bootloader performing a function for content security is not provided from the service server 100 but provided through the security server 102 connectable by the loader, so that the bootloader and the security module can be safely provided in the state in which they are not open.

Figure 2:
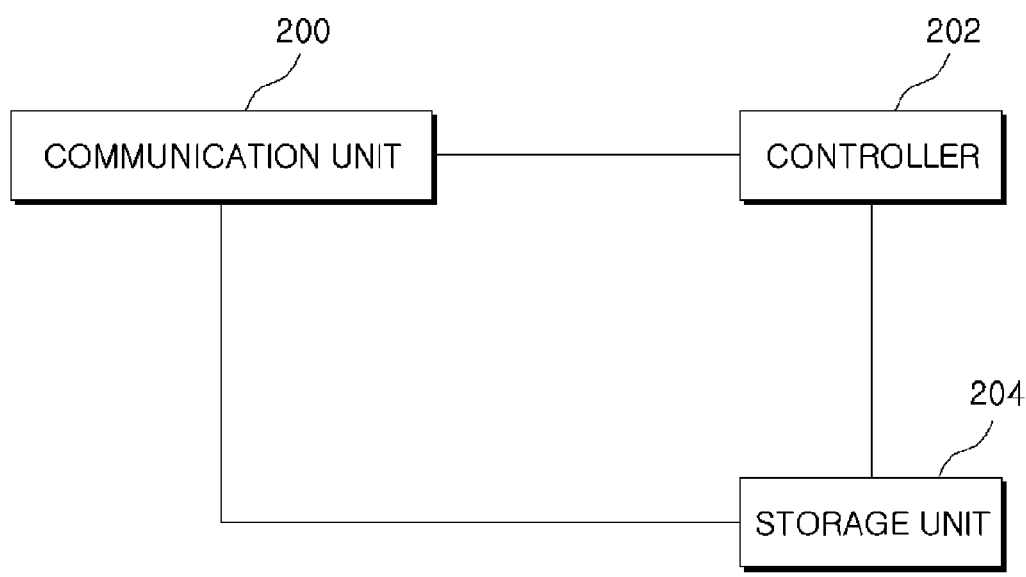
FIG. 2 is a diagram illustrating a detailed configuration of a security server according to an embodiment of the present invention.

FIG. 2 is a diagram illustrating a detailed configuration of the security server according to an embodiment of the present invention.

As shown in FIG. 2, the security server 102 may include a communication unit 200, a controller 202, and a storage unit 204.

The communication unit 200 communicates with a user terminal 104 in a loader being executed.

When a request of a bootloader is received from the user terminal 104 through the communication unit 200, the controller 202 controls a bootloader stored in the storage unit 204 to be transmitted to the user terminal 104.

In this case, the user terminal 104 executes the bootloader received from the communication unit 200 of the security server 102, and requests the security server 102 of a security module including a certificate, a security client, and a security policy through the bootloader.

When the request is received, the communication unit 200 transmits a security module stored in the storage unit 204 to the user terminal 104.

When downloads of the bootloader and the security module are completed, the user terminal 104 may be connected to a content server (not shown) to receive an encrypted content, and decrypt the encrypted content.

Figure 3:
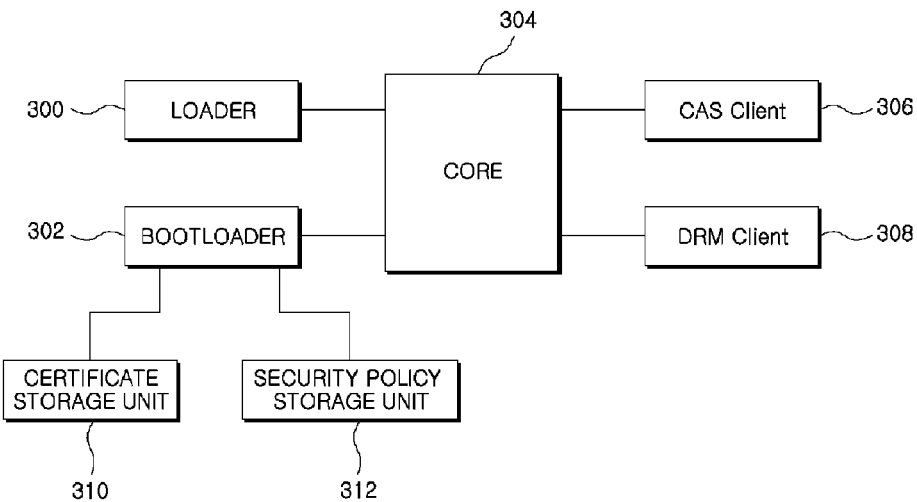
FIG. 3 is a diagram illustrating a detailed configuration of a user terminal according to an embodiment of the present invention.

FIG. 3 is a diagram illustrating a detailed configuration of the user terminal according to an embodiment of the present invention.

As shown in FIG. 3, the user terminal 102 according to the embodiment of the present invention may include a loader 300, a bootloader 302, a core 304, a CAS client 306, a DRM client 308, a certificate storage unit 310, and a security policy storage unit 312.

The loader 300 is provided from the service server 100 such as a web server or a mobile app store server to be installed in the user terminal 102. The loader 300 communicates with the security server 102 through security server address information.

The loader 300 requests the security server 102 of a bootloader, and accordingly, the bootloader is downloaded to be installed and executed in the user terminal 104.

The bootloader 302 according to the embodiment of the present invention manages a certificate, a security policy, and a security client.

More specifically, the bootloader 302 according to the embodiment of the present invention determines whether a certificate exists. When any certificate does not exist, the bootloader 302 requests the security server 102 of a certificate.

The bootloader 302 monitors an available period of the certificate. When the available period is expired, the bootloader 302 requests the security server 102 of a new certificate.

The certificate provided from the security server 102 is stored in the certificate storage unit 310.

The bootloader 302 determines whether a security policy exists. When any security policy does not exist or when the version of a security policy is updated, the bootloader 302 requests the security server 102 of a security policy. The security policy is stored in the security policy storage unit 312.

Here, the security policy includes information on an available period of the bootloader, available periods of the CAS client and the DRM client, and an available period of the security policy, and may be provided as a configuration file.

When an update of the bootloader 302 is required by the security policy, the bootloader 302 may request the security server 102 of a new bootloader.

The bootloader 302 according to the embodiment of the present invention requests the security server 102 of the CAS client 306 required to acquire a control word in the use of a content and the DRM client 308 for preventing illegal copies.

The core 304 performs a function of decrypting an encrypted content in connection with the CAS client 306 and the DRM client 308.

For example, the user terminal 104 receives, from the content server, an entitlement management message (EMM) and an entitlement control message (ECM) together with an encrypted content (scrambled content).

The CAS client 306 extracts information (e.g., a control word) for descrambling the scrambled content by using information included in the EMM and the ECM. The core 304 descrambles the encrypted content by using the extracted control word, and transmits the descrambled content to a display unit (not shown).

Figure 4:
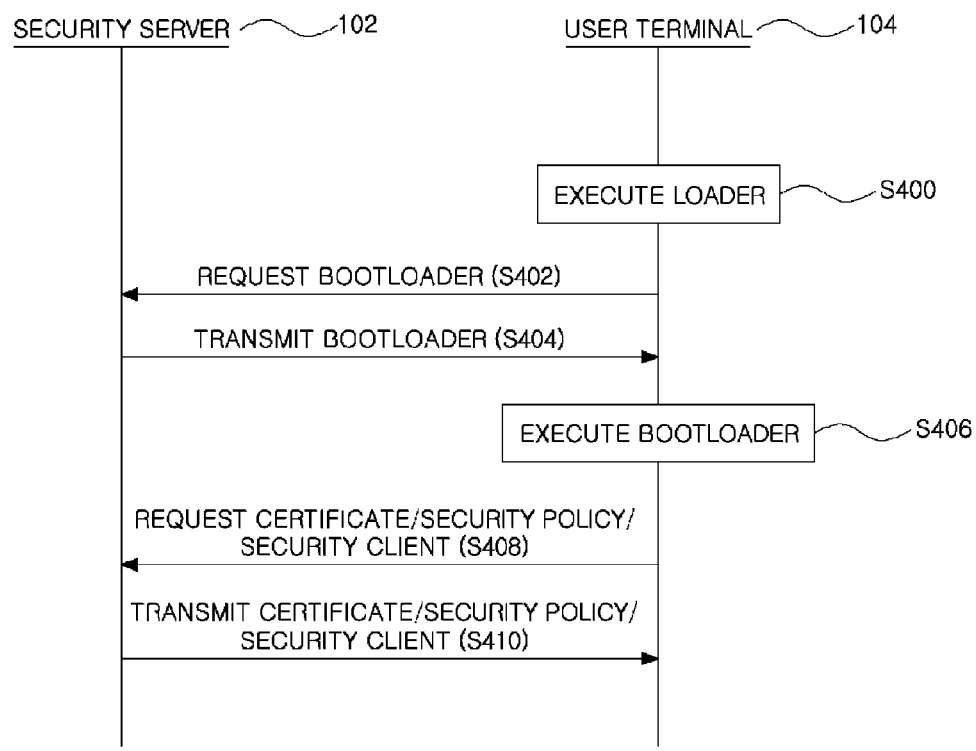
FIG. 4 is a sequence diagram illustrating a process of downloading a security module according to an embodiment of the present invention.

FIG. 4 is a sequence diagram illustrating a process of downloading a security module according to an embodiment of the present invention.

Referring to FIG. 4, the user terminal 104 executes a loader downloaded from the service server 100 (step S400).

The loader according to the embodiment of the present invention includes address information of the security server 102. The user terminal 104 is connected to the security server 102 through the loader, and requests the security server 102 of a bootloader (step S402).

The security server 102 transmits the bootloader to the user terminal 104 (step S404).

The user terminal 104 executes the downloaded bootloader (step S406), and requests the security server 102 of a security module including a certificate, a security policy, and a security client through the bootloader (step S408).

The security server 102 transmits the requested security module to the user terminal 104 (step S410).

Figure 5:
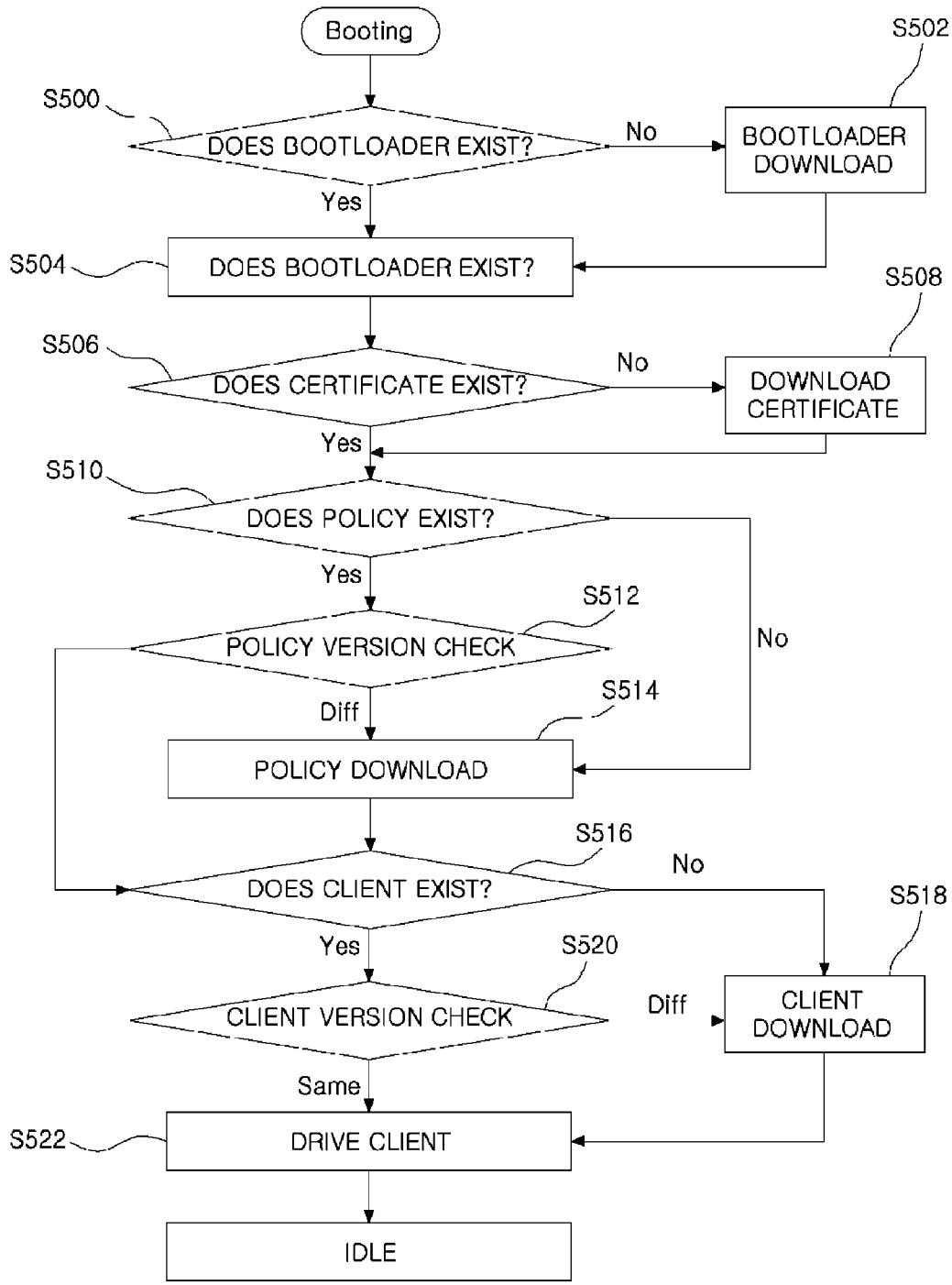
FIG. 5 is a flowchart illustrating a process of controlling a download of a security module in a user terminal according to an embodiment of the present invention.

FIG. 5 is a flowchart illustrating a process of controlling a download of a security module in the user terminal according to the embodiment of the present invention.

Referring to FIG. 5, the user terminal 104 determines whether a bootloader exists in booting (step S500). When any bootloader does not exist, the user terminal 104 is connected to the security server 102 to download a bootloader (step S502).

Meanwhile, when a bootloader exists, the bootloader is driven (step S504). The bootloader determines whether a certificate exists (step S506). When any certificate does not exist, the user terminal 104 downloads a certificate from the security server 102 (step S508).

When a certificate exists, the bootloader 302 determines whether a security policy exists (step S510). When a security policy exists, the bootloader 302 checks a version of the security policy (step S512).

When any security policy does not exist or when the version of the security policy does not correspond to a current version, the bootloader 302 downloads a security policy from the security server 102 (step S514).

When the version of the security policy corresponds to the current version, the bootloader 302 determines whether a security client exists (step S516).

As described above, the security client may include the CAS client 306 for descrambling the scrambled content and the DRM client 308.

When any security client does not exist, the bootloader 302 downloads a security client from the security server 102 (step S518).

Meanwhile, although a security client exists, the bootloader 302 checks a version of the security client (step S520). When the version of the security client does not correspond to a current version, step S518 is performed.

When the version of the security client corresponds to the current version, the security client is driven (step S522).

Embodiments of the present invention may be implemented in a program command form capable of being performed through various computer means to be recorded in a computer-readable recording medium. The computer-readable recording medium may include a program command, a data file, a data structure, and the like separately or in a combination thereof. The program command recorded in the recording medium may be a command designed or configured specially for the present invention, or usably known to a person having ordinary skill in the computer software art. Examples of the computer-readable recording medium include magnetic media such as hard disks, floppy disks, and magnetic tapes, optical media such as CD-ROM and DVD, magneto-optical media such as floptical disks, and a hardware device such as ROM, RAM, and flash memory, which is configured to store and perform program commands. Examples of the program commands include a machine language code made by a compiler and a high-level language code implemented using an interpreter by a computer. The hardware device can be configured as at least one software module to perform the operation of embodiments of the present invention, and vice versa.

While the present invention has been described with respect to the specific embodiments, it will be apparent to those skilled in the art that various changes and modifications may be made without departing from the spirit and scope of the invention as defined in the following claims.

The invention claimed is:

1. A method for controlling a download of a security module for a broadcast service in a user terminal connected to a service server and a security server through a network, the method comprising:
   connecting to the service server through a browser;
   downloading a loader to the user terminal from the service server;
   executing the loader in a plug-in manner;
   connecting the user terminal to the security server through the loader;
   downloading a bootloader from the security server to the user terminal;
   downloading a security module from the security server to the user terminal by executing the bootloader;
   downloading encrypted content to the user terminal from the service server; and
   decrypting the encrypted content using the downloaded bootloader and the security module,
   wherein the service server includes a web server or a mobile app store server,
   a web page or a mobile app including the loader is transmitted to the user terminal from the service server when downloading the loader, and
   the user terminal is connected to the security server through installation and execution of the loader.

2. The method of claim 1, wherein the security module includes at least one of a CAS client, a DRM client, a security policy, or a certificate.

3. The method of claim 2, wherein the bootloader is configured to determine whether each of the CAS client, the DRM client, the security policy, and the certificate exists and whether each of the CAS client, the DRM client, the security policy, and the certificate is updated.

4. The method of claim 3, wherein the bootloader is configured to determine whether a new bootloader is downloaded with reference to the security policy.

5. The method of claim 1, wherein the loader includes address information of the security server, and is configured to communicate with the security server by using the address information.

6. The method of claim 1, wherein the bootloader and the security module are configured to perform decryption of an encrypted content.

7. A non-transitory computer-readable recording medium storing a program, which when executed by a computer, configures the computer to perform the method of claim 1.

8. The method of claim 1, wherein downloading the loader downloads the web page or the mobile app including the loader to the user terminal from the service server.

9. A security server device connected to a user terminal through a network, the security server device comprising:
   a communication unit configured to receive a request of a bootloader from the user terminal, the user terminal configured to be connected to a service server through a browser and to drive a loader in a plug-in manner;
   a storage configured to store the bootloader and a security module; and
   a controller configured to control the bootloader and the security module to be transmitted to the user terminal through the communication unit such that the user terminal is configured to download encrypted content to the user terminal from the service server, and decrypt the encrypted content using the downloaded bootloader and the security module,
   wherein the service server includes a web server or a mobile app store server, and provides a web page or a mobile app including the loader to the user terminal from the service server, and
   the user terminal is connected to the security server through installation and execution of the loader.

10. The security server device of claim 9, wherein the security module includes at least one of a CAS client, a DRM client, a security policy, or a certificate.

* * * * *